United States Patent [19]
Rossi

[11] Patent Number: 5,317,125
[45] Date of Patent: May 31, 1994

[54] FUSING APPARATUS WITH TEMPERATURE CONTROL

[75] Inventor: Alessandro Rossi, Florence, Italy

[73] Assignee: Axis U.S.A., Inc., Marlborough, Mass.

[21] Appl. No.: 21,725

[22] Filed: Feb. 22, 1993

Related U.S. Application Data

[63] Continuation of Ser. No. 596,876, Oct. 12, 1990.

[51] Int. Cl.$^5$ .......................................... B23K 11/25
[52] U.S. Cl. .................... 219/110; 219/56.1; 228/9
[58] Field of Search .............. 219/56.1, 56, 58, 109, 219/110, 56.22; 29/597; 374/180; 228/4.5, 8, 9

[56] References Cited

U.S. PATENT DOCUMENTS

| | | | |
|---|---|---|---|
| 2,104,749 | 1/1939 | Jones | 219/110 |
| 3,309,494 | 3/1967 | Herbert et al. | 219/110 |
| 3,648,009 | 3/1972 | Steigerwald | 219/110 |
| 3,778,581 | 12/1973 | Denny | 219/110 |
| 3,781,981 | 1/1974 | Miura et al. | 29/597 |
| 4,071,730 | 1/1978 | Bassler | 29/597 |
| 4,079,225 | 3/1978 | Warner | 219/110 |
| 4,214,164 | 7/1980 | Traub et al. | 219/109 |
| 4,224,496 | 9/1980 | Riordan et al. | 219/110 |
| 4,359,622 | 11/1982 | Dostoomian et al. | 219/110 |
| 4,472,620 | 9/1984 | Nied | 219/110 |
| 4,529,869 | 7/1985 | Ekstrom, Jr. | 374/180 |
| 4,849,600 | 7/1989 | Herschitz et al. | 219/110 |
| 4,894,508 | 1/1990 | Glenn et al. | 219/110 |

FOREIGN PATENT DOCUMENTS 62-273745 11/1987 Japan ........................................ 228/9

Primary Examiner—Geoffrey S. Evans
Attorney, Agent, or Firm—Robert R. Jackson; Robert W. Morris

[57] ABSTRACT

Methods and apparatus for monitoring the temperature of a workpiece during fusing operations are provided. The apparatus includes a temperature sensor which monitors the temperature of a commutator bar being fused and outputs an electrical signal corresponding to that temperature. The electric current supplied to the fusing electrode can be interrupted or modified if the temperature of the commutator bar exceeds a predetermined temperature. In this manner, fusing operations can be interrupted if the temperature of the commutator bar approaches a temperature at which other components of the workpiece, such as the core material will be adversely affected. The temperature sensor preferably contacts the workpiece to conduct heat to a sensing element.

33 Claims, 2 Drawing Sheets

FUSING APPARATUS WITH TEMPERATURE CONTROL

CROSS REFERENCE TO RELATED APPLICATION

This application is a continuation of copending, commonly-assigned United States patent application Ser. No. 07/596,876, now abandoned, filed Oct. 12, 1990.

BACKGROUND OF THE INVENTION

This invention relates to a fusing apparatus for fusing wires to a commutator of an electric motor. More particularly, this invention relates to a fusing apparatus in which a temperature sensor is provided for controlling the fusing operation.

Conventional armature commutators are formed of copper alloy bars which are anchored to a core material to form a commutator surface. The lead wires from the wound armature are passed around hooks or "tangs" of the commutator, or are inserted into slots in the commutator. The wires are then fused to the commutator by applying pressure and heat.

Until recently, the core material which supports and anchors the bars of the commutator included asbestos, which was resistant to the effects of heat. The materials now being used to form the core of conventional armature commutators do not include asbestos and are more sensitive to heat. The structural characteristics of these new materials may be altered at temperatures which are lower than those required to affect materials including asbestos.

During fusing, a large amount of heat may be dissipated to the core materials through the commutator bars. The heat transferred to the core materials must be controlled, to prevent irreversible damage to the commutator. If the heat transfer is not controlled, the ability of the core materials to anchor the commutator bars could be impaired. This might result in, for example, the commutator bars coming loose when subjected to centrifugal forces developed during operation of the motor.

Thus it is important to monitor the heat flow from the fusing electrode to the core material of the commutator. It also is important to control the heat flow to maintain the temperature of the core material within a safe range of temperatures.

SUMMARY OF THE INVENTION

It is an object of this invention to provide a fusing apparatus in which the heat flowing from a fusing electrode of the apparatus to the core material of a commutator can be monitored.

It is also an object of this invention to provide a fusing apparatus in which the temperature of the core material of a commutator can be controlled and maintained within a safe range.

It is another object of this invention to provide a fusing apparatus in which the operation of the fusing apparatus can be interrupted or modified to adjust the amount of heat transferred to the core material of a commutator.

It is another object of this invention to provide a temperature sensor for a fusing apparatus that can be used for monitoring temperatures of a wide variety of commutator sizes without manual readjustment.

In accordance with this invention, there is provided a fusing apparatus in which a temperature sensor is coupled to the fusing assembly so as to contact a workpiece during a fusing operation. The temperature sensor detects heat transferred to the workpiece, and converts the heat to an electrical signal representative of the temperature of the workpiece. The temperature sensor transmits the electrical signal to a control circuit. The control circuit then evaluates the electrical signal and acts to interrupt or modify the electricity delivered to the fusing electrode, thereby controlling the heat applied to the commutator bar being fused. The control circuit modifies the fusing operation to ensure that the core material of the commutator is maintained at a safe temperature.

BRIEF DESCRIPTION OF THE DRAWINGS

The above and other objects and advantages of the invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
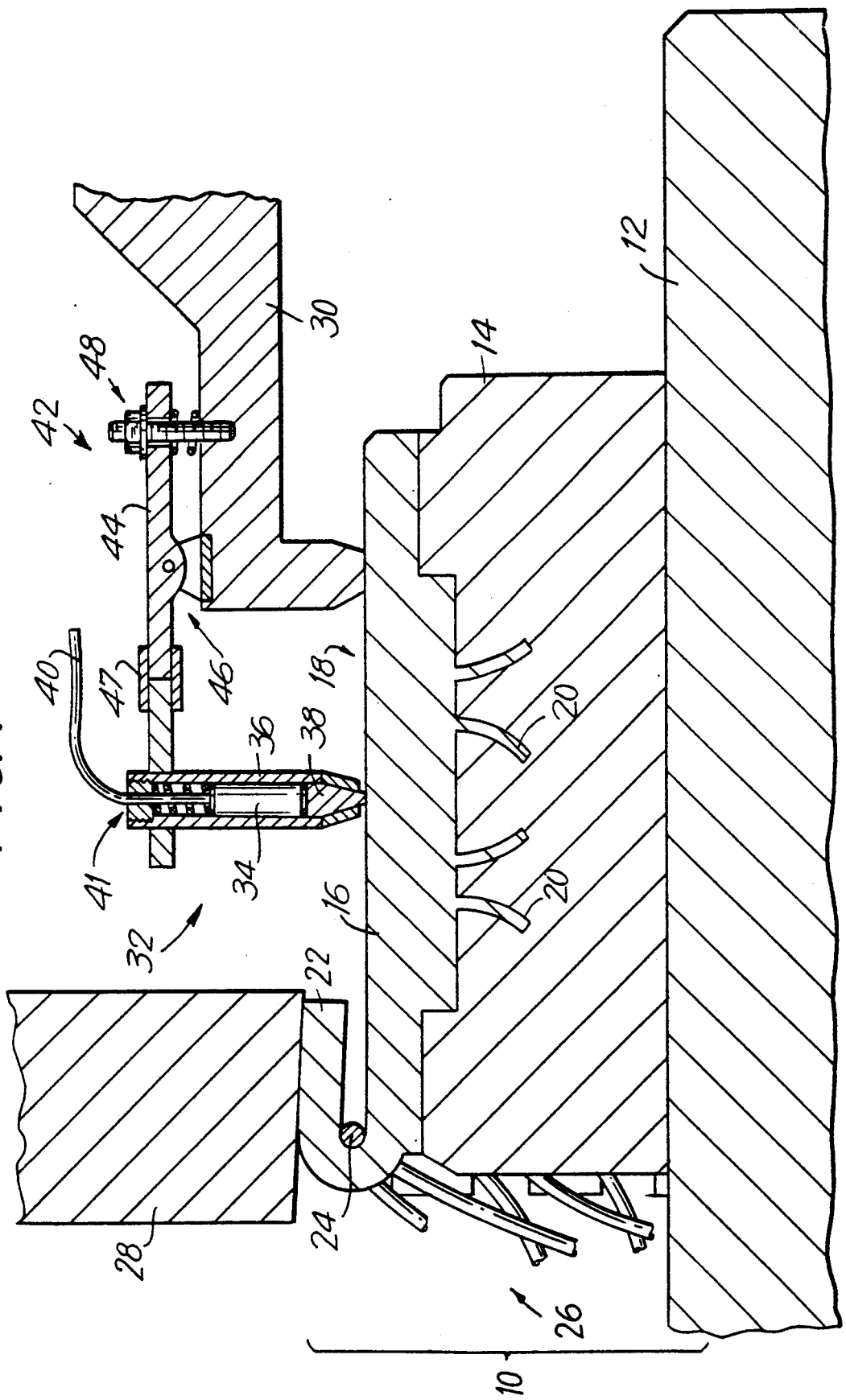
FIG. 1 is a partial, longitudinal sectional view of an armature commutator and of the fusing assembly of a fusing apparatus constructed in accordance with the principles of the present invention.

Referring now to FIG. 1, the fusing assembly of the present invention acts upon a workpiece, such as an armature 10 of an electric motor. Armature 10 includes a shaft 12, a core 14 which surrounds the shaft, and a plurality of commutator bars 16 closely spaced around the surface of core 14. Commutator bars 16 are supported by core 14 to form a cylindrical running surface 18 for the brushes of the electric motor. Bars 16 are anchored to core 14 by support legs 20, which are embedded within the core.

Commutator bar 16 includes a tang 22 or a slot (not shown) which receives one or more lead wires 24 when armature 10 is wound. Tang 22 is fused to wire 24 and to running surface 18, to hold Wire 24 in place and to establish the desired electrical resistance between the wire and bar 16. The fusing operation may be performed as shown in commonly assigned, co-pending U.S. patent application Ser. No. 07/436,633, filed Nov. 15, 1989, which is hereby incorporated by reference herein in its entirety.

Core 14 may include materials which are adversely affected by the heat generated during the fusing operation, making it desirable to monitor the temperature of the core. However, core 14 is completely surrounded by commutator bars 16 and by the leads 26 from the armature windings. Temperature measurements representative of the temperature of core 14 therefore are preferably taken from a surface adjacent to core 14, such as running surface 18 of commutator 16.

The fusing assembly of the present invention, shown in FIG. 1, includes a fusing electrode 28, a ground electrode 30, and a temperature sensing assembly 32. Fusing electrode 28 typically may be a high resistivity, tungsten electrode. Ground electrode 30 is formed of a low resistivity material. During fusing, fusing electrode 28 approaches and contacts tang 22 (or a slot). Ground electrode 30 approaches and contacts commutator bar 16. Ground electrode 30 provides a low resistance path for electric current to flow through fusing electrode 28 and commutator bar 16. Fusing electrode 28 heats tang 22 and deforms the tang to contact and fuse with running surface 18 of commutator 16.

Temperature sensor 32 includes a temperature sensing element 34, a holding means 36, a thermally conductive element 38, and electrical leads 40. Thermally conductive element 38 is formed of highly thermally conductive material such as a copper or silver alloy. Conductive element 38 contacts commutator bar 16 and is disposed adjacent to sensing element 34. Element 38 prevents direct contact of sensing element 34 with commutator bar 16. Element 38 can be replaced if it becomes worn. Sensing element 34 and conductive element 38 are held by holding means 36, which electrically and thermally insulates sensing and conducting elements 34 and 38 from surrounding electrical and thermal disturbances. Electrical output leads 40 are appropriately strain discharged by discharge mechanism 41, to minimize the effects of leads 40 on the positioning of temperature sensor 32.

A support assembly 42 couples temperature sensor 32 to ground electrode 30. Support assembly 42 typically may include a support arm 44, which preferably is hinged to ground electrode 30 by a hinge 46 and a compensating mechanism such as spring assembly 48. Arm 44 preferably includes mount 47 to isolate thermally and electrically temperature sensor 32 from grounding electrode 30. It is desirable to connect temperature sensor 32 to the ground electrode so that the temperature sensor is automatically brought into contact with commutator bar 16 each time ground electrode 30 contacts the commutator bar. As described in U.S. patent application Ser. No. 07/436,633, ground electrode 30 is actuated by an assembly which causes the ground electrode to come in contact with the commutator each time a bar is to be fused. Spring assembly 48 permits adjustment of the force with which temperature sensor 32 contacts commutator bar 16.

One skilled in the art will appreciate that a variety of design schemes could be implemented to bring temperature sensor 32 in thermal contact with commutator bar 16. Whatever design is used, it is important that the temperature sensor not interfere significantly with the ability of the fusing machine to operate automatically and to process workpieces of different physical characteristics and dimensions. The temperature sensor also must not diminish the quality of the fused joint by interrupting the application of both heat and pressure, as discussed below, so as not to fuse properly.

In accordance with a preferred embodiment, to monitor the temperature of core 14 during the fusing operations, temperature sensor 32 contacts commutator bar 16. Heat from bar 16 is conducted to sensing element 34. Sensing element 34 preferably includes a thermocouple or a low inertia resistance sensor and generates an electrical signal which represents both the temperature of commutator bar 16 and, by relating the known thermal properties of the commutator bar and core material, the temperature of core 14 underlying commutator bar 16. Known sensors which collect radiation, such as optical sensors, may not be practical for this application because the accuracy of such optical sensors is adversely affected by interfering radiation or reflections from the hot fusing electrode and because such sensors typically must be re-aimed each time working conditions change (e.g., a differently sized commutator is to be fused) to obtain a best temperature measurement. It is anticipated, however, that improvements in optical sensors may permit use of optically detecting the temperature of commutator bar 16 in the present invention.

During fusing, heat is transferred to core 14 extremely quickly. Sensing element 34 must therefore respond quickly to follow the fusing operation, to permit interruption or modification of the fusing operation to prevent damage to core 14. The thermocouple or low inertia resistance sensor of sensing element 34 typically may have a thickness in the order of 0.0002 inches and a response time of approximately 10 milliseconds.

Once the heat transferred to core 14 can be correctly monitored, it is possible to control the current supplied to the heat source (i.e., fusing electrode 28). The current control may be implemented using commercially available and known techniques. The current supply to the fusing electrode is controlled so that the temperature of core 14 remains within a predetermined range.

Figure 2:
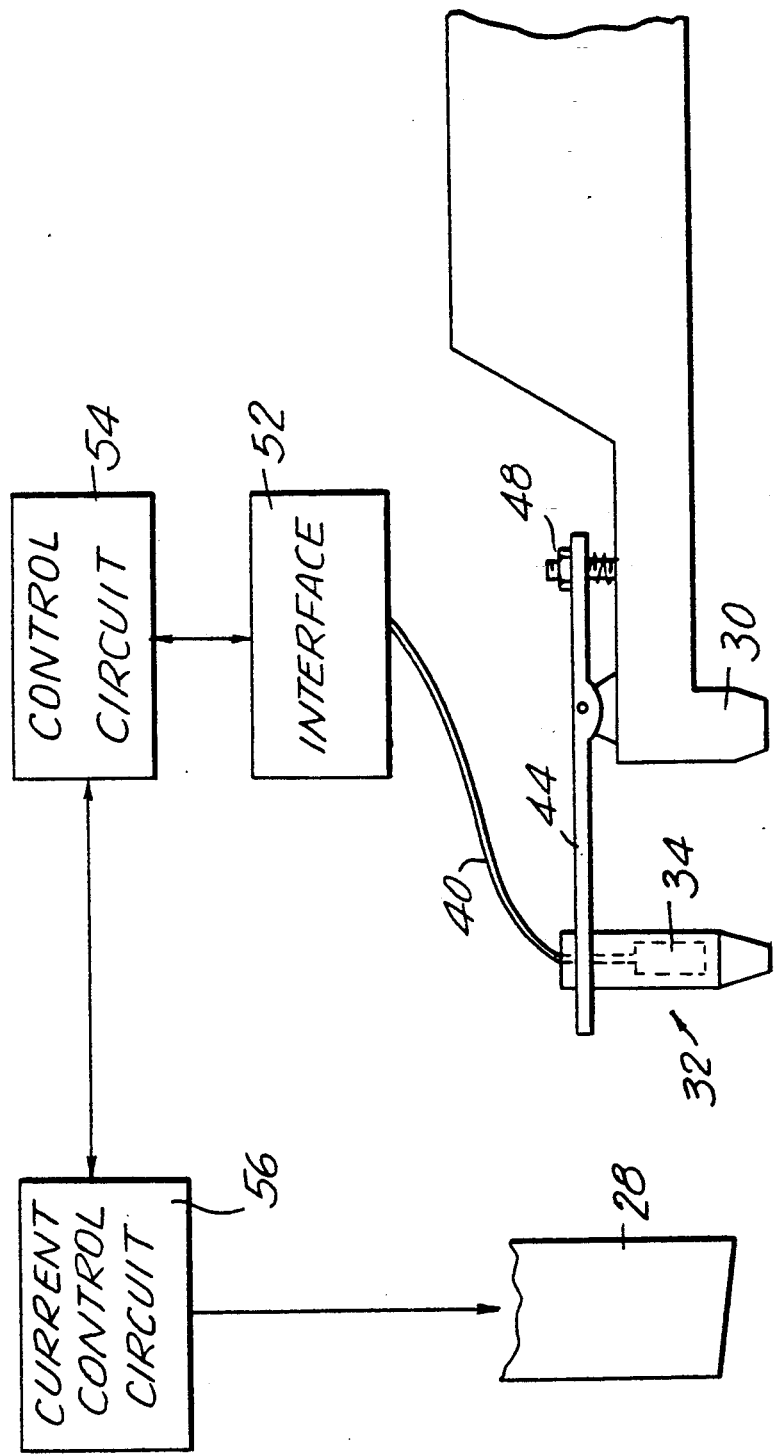
FIG. 2 is a partial block diagram of a fusing apparatus constructed in accordance with the principles of the present invention.

As shown in FIG. 2, leads 40 electrically couple sensing element 34 to a conventional temperature signal receiver/transmitter 52. Receiver/transmitter 52 is coupled to a control circuit 54, which typically may include a microprocessor. Control circuit 54 interfaces in a conventional manner with the current control circuit 56 of fusing electrode 28. Control circuit 54 typically may monitor the temperature of commutator bar 16 and compare the temperature detected to a predetermined or threshold temperature corresponding to an acceptable elevated temperature for core 14 to ensure that the heat transferred to core 14 does not exceed an acceptable level.

For certain fusing operations, it may be necessary or desirable to interrupt the current supply to fusing electrode 28 prior to completing the fused tang or slot joint, while maintaining the pressure applied to the tang or slot to complete the fusing operation. In this instance, the pressure and displacement feedback processes disclosed in U.S. patent application Ser. No. 07/436,633 can be used to continue the fusing operation without applying additional heat when it is determined that the core temperature is at the predetermined threshold and to resume additional heating once the temperature of core 14 has decreased to or below the acceptable, predetermined value.

In addition, control circuit 54 may be configured to actuate a cooling mechanism when it is determined that the core temperature has reached a selected temperature whereby the cooling mechanism is intermittently or continuously operated in response to the determined core temperature to maintain a desired thermodynamic equilibrium during the fusing operation without adversely affecting the core material.

Thus a fusing apparatus having a temperature sensor for monitoring the temperature of a workpiece and varying the fusing operation in response to the temperature of the workpiece is provided. One skilled in the art will appreciate that the present invention can be practiced by other than the described embodiments, which are presented here for purposes of illustration and not of limitation, and the present invention is limited only by the claims that follow.

What is claimed is:

1. Apparatus for fusing together two electrical conductors which collectively comprise a workpiece, said apparatus comprising:
    a fusing member for performing heating and mechanical work on said workpiece;

a grounding member; and a detecting means for detecting the temperature of a surface of said workpiece during fusing, said detecting means having conducting means which make contact with said surface for conducting heat from said surface of said workpiece and converting said heat into an electrical signal, said detecting means being distinct from said fusing member and said grounding member.

2. The apparatus of claim 1, further comprising controlling means responsive to said electrical signal for controlling electrical energy applied to said fusing member.

3. The apparatus of claim 2, wherein said controlling means interrupts the electrical energy to said fusing member when the temperature of said surface exceeds a predetermined temperature.

4. The apparatus of claim 3, wherein said controlling means reconnects the electrical energy to said fusing member when the temperature of said surface decreases to a temperature below a second predetermined temperature.

5. The apparatus of claim 2, wherein said controlling means comprises a microprocessor-based control circuit.

6. The apparatus of claim 1, wherein said conducting means comprises:

a thermocouple for converting heat to an electrical signal; and a thermally conductive member in contact with said workpiece and adjacent said thermocouple so that said thermocouple does not make contact with said workpieces.

7. The apparatus of claim 1, further comprising insulating means for insulating said conducting means.

8. The apparatus of claim 1, wherein said detecting means is coupled to said grounding member and automatically contacts said workpiece when said grounding member contacts said workpiece.

9. The apparatus of claim 1, wherein said detecting means further includes means for alignment which automatically align said detecting means with said workpiece.

10. A method for monitoring during a fusing operation the temperature of the core materials underlying the commutator bars of an armature commutator, said method comprising the steps of:

detecting heat applied to the commutator bar on which the fusing operation is being performed by contacting a thermally conductive member, which distinct from said fusing operation, with said commutator bar;

generating a first electrical signal corresponding to the heat detected on said commutator bar; and comparing said first electrical signal with a second electrical signal corresponding to a known temperature.

11. The method of claim 10, further comprising the step of modifying the electrical energy supplied to a fusing electrode during the fusing operation in response to said first electrical signal.

12. The method of claim 11, wherein said step of modifying the electrical energy comprises interrupting said electrical energy when said first electrical signal exceeds said second electrical signal.

13. The method of claim 11, wherein said second electrical signal corresponds to a temperature at which said core material of said commutator may be adversely affected.

14. The method of claim 10, wherein said step of detecting heat further comprises automatically aligning said thermally conductive member with said commutator bar.

15. Apparatus for fusing together two electrical conductors which collectively comprise a workpiece, said apparatus comprising:

a fusing means for delivering electrical energy and applying pressure to one of the electrical conductors;

a grounding means for draining said electrical energy from said workpiece;

a detecting means for detecting the temperature of a surface of said workpiece during fusing, said detecting means having conducting means, distinct from said fusing means and said grounding means, which make contact with said surface for conducting heat from said surface of said workpiece; and a converting means for converting said conducted heat into an electrical signal corresponding to said detected temperature.

16. The apparatus of claim 15, further comprising controlling means for controlling the delivery of electrical energy to said workpiece, said controlling means being responsive to said electrical signal.

17. The apparatus of claim 16, wherein said controlling means interrupts the delivery of electrical energy to said workpiece when the temperature of said surface exceeds a first predetermined temperature.

18. The apparatus of claim 17, wherein said controlling means resumes the delivery of electrical energy to said workpiece when the temperature of said surface decreases to a temperature below a second predetermined temperature.

19. The apparatus of claim 16, wherein said controlling means comprises a microprocessor-based control circuit.

20. The apparatus of claim 15, wherein the converting means further comprises a low inertia resistance sensor.

21. The apparatus of claim 15, further comprising means for holding said conducting means and said converting means so that both said conducting means and said converting means are thermally and electrically isolated and said conducting means is in thermal communication with said workpiece surface.

22. The apparatus of claim 15, wherein said detecting means is coupled to said grounding member and automatically contacts said workpiece when said grounding member contacts said workpiece.

23. The apparatus of claim 22, wherein said detecting means further comprises a spring for urging said heat conducting means in contact with said workpiece.

24. The apparatus of claim 15, wherein said conducting means is a thermally conductive member in contact with said workpiece.

25. The apparatus of claim 15, wherein said converting means further comprises a thermocouple.

26. The apparatus of claim 15, wherein said detecting means further includes means for alignment which automatically align said detecting means with said workpiece.

27. In an operation for fusing armature workpieces having a plurality of commutator bars disposed around an underlying core material, a method for monitoring the temperature of the core materials underlying a commutator bar being fused comprising the steps of:
- delivering electrical energy to one of said commutator bars;
- detecting the temperature of said one commutator bar receiving electrical energy by contacting a temperature sensor, distinct from said operation for fusing, with said one commutator bar;
- generating a first electrical signal corresponding to the temperature detected on said one commutator bar; and
- determining a temperature corresponding to the temperature of the core material based on the generated first electrical signal and the thermal properties of the commutator bar and core material.

28. The method of claim 27, further comprising controlling the delivery of electrical energy to said one commutator bar in response to the first electrical signal.

29. The method of claim 27, wherein said step of detecting the temperature further comprises automatically aligning said temperature sensor with said commutator bar.

30. The method of claim 27, further comprising:
- providing a second electrical signal corresponding to a selected elevated temperature of the core material;
- comparing said first electrical signal to said second electrical signal; and
- indicating when the determined temperature of the core material is the same or greater than the selected threshold temperature of the core material.

31. The method of claim 30, wherein said second electrical signal corresponds to a temperature that is below the temperature at which said core material may be adversely affected.

32. The method of claim 30 further comprising controlling the delivery of electrical energy to said one commutator bar in response to the compared first and second signals.

33. The method of claim 32, wherein controlling the electrical energy further comprises interrupting delivery of said electrical energy to said commutator bar when the indicated temperature of the core material is the same or greater than the selected threshold temperature of the core material.

* * * * *